(12) United States Patent
Schmidt et al.

(10) Patent No.: US 9,783,055 B2
(45) Date of Patent: Oct. 10, 2017

(54) DRIVER ASSISTANCE SYSTEM

(71) Applicant: GM GLOBAL TECHNOLOGY OPERATIONS LLC, Detroit, MI (US)

(72) Inventors: Christoph Schmidt, Wiesbaden (DE); Gerald Schmidt, Frankfurt am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 33 days.

(21) Appl. No.: 14/965,503

(22) Filed: Dec. 10, 2015

(65) Prior Publication Data

US 2016/0167515 A1     Jun. 16, 2016

(30) Foreign Application Priority Data

Dec. 15, 2014   (DE) .................... 20 2014 009 919 U

(51) Int. Cl.
| | |
|---|---|
| *G06F 7/00* | (2006.01) |
| *B60K 35/00* | (2006.01) |
| *G02B 27/01* | (2006.01) |
| *G08G 1/16* | (2006.01) |
| *G08G 1/0962* | (2006.01) |

(52) U.S. Cl.
CPC ............. *B60K 35/00* (2013.01); *G02B 27/01* (2013.01); *G08G 1/0962* (2013.01); *G08G 1/16* (2013.01); *G08G 1/165* (2013.01); *B60K 2350/352* (2013.01); *B60K 2350/921* (2013.01); *G02B 2027/014* (2013.01); *G02B 2027/0187* (2013.01)

(58) Field of Classification Search
CPC ............ G01S 13/931; B60T 2201/022; G06K 9/00805
USPC ............ 701/36; 340/435, 436, 903; 382/106
See application file for complete search history.

(56) References Cited

U.S. PATENT DOCUMENTS 6,906,639 B2 *  6/2005  Lemelson ............. G01S 13/931
                                                   180/167
7,605,773 B2   10/2009  Janssen

FOREIGN PATENT DOCUMENTS

| DE | 102007045932 A1 | 4/2009 |
|---|---|---|
| DE | 102008038831 A1 | 2/2010 |

OTHER PUBLICATIONS

German Patent Office, German Search Report for German Application No. 202014009919.7, dated Aug. 21, 2015.

* cited by examiner

*Primary Examiner* — Gertrude Arthur Jeanglaude
(74) *Attorney, Agent, or Firm* — Lorenz & Kopf LLP

(57) ABSTRACT

A driver assistance system enables accelerate awareness of a danger source by the driver of a motor vehicle. The driver assistance system includes a display field that, from the viewpoint of the driver, is larger than a primary field of vision, which can be scanned without eye movement on the part of the vehicle driver. The driver assistance system also includes a control unit for displaying signs at different locations in the display field, and a hazard detection unit for detecting at least the direction in which a hazard outside the vehicle is located from the viewpoint of the driver. The control unit is configured to first display a preliminary signal in a preferred direction from the viewpoint of the driver, and then to display at least a first follow-up signal in an intermediate direction between the preferred direction and the direction in which the danger source is located.

14 Claims, 2 Drawing Sheets

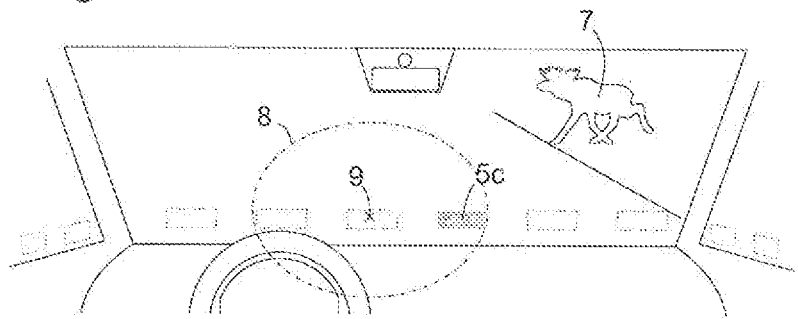
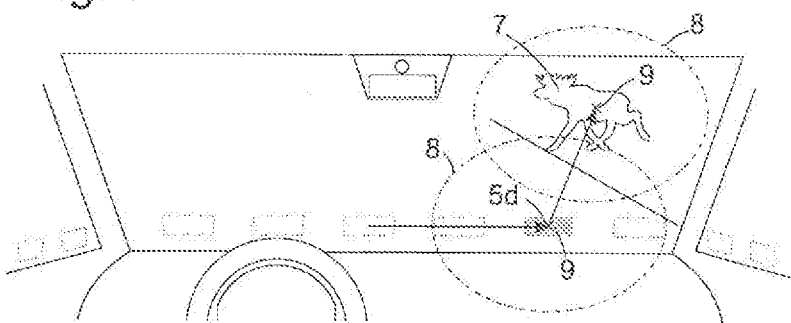
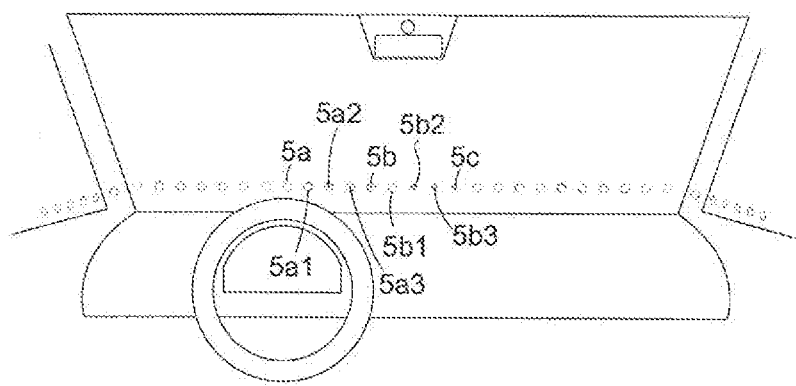

DRIVER ASSISTANCE SYSTEM

CROSS-REFERENCE TO RELATED APPLICATION

This application claims priority to German Patent Application No. 202014009919.7, filed Dec. 15, 2014, which is incorporated herein by reference in its entirety.

TECHNICAL FIELD

The present disclosure pertains to a driver assistance system that helps the driver of a vehicle to quickly become aware of and evaluation potentially hazardous situations.

BACKGROUND

Humans are undoubtedly capable of scanning a very wide field of vision by swiveling their eyes, but while the eyes are not moving it is only possible for information from a small fraction of this field of vision to actually register in the consciousness of the subject. This fraction, referred to here as the primary field of vision, typically extends azimuthally through an angle of about 40°. If the driver of a motor vehicle keeps his gaze fixed firmly on an object, for example a traffic sign he wants to read, it is no longer assured that he will reliably be aware of possible sources of danger that are located outside of his primary field of vision, that is to say with an angular separation of more than 20° from the object of his attention.

A driver assistance system that is capable of detecting at least the direction from the point of view of a motor vehicle driver in which a hazard or source of danger outside the vehicle is located, and displaying an arrow symbol on the front windscreen of the vehicle indicating the direction in which the driver must look to see the detected danger source is known from DE 10 2007 045 932 A1. A further warning signal can be displayed in the windscreen next to the intersection point with a line that connects the driver and the danger source, to warn the driver of danger source explicitly when he has adjusted his view to look in the direction of the danger source.

This conventional driver assistance system requires the driver to first become actively aware of the arrow signal and to understand it. If he then changes his view to look in the direction indicated by the arrow signal, sooner or later the second warning signal or the danger source will come into his field of vision. The conscious awareness and evaluation of the arrow signal, and the subsequent search of the windscreen for the second warning signal takes a considerable time, the length of which depends on the driver's ability to concentrate.

SUMMARY

In accordance with the present disclosure a driver assistance system is able to accelerate awareness of a danger source by the driver of a motor vehicle. A driver assistance system is provided for installation in a vehicle and includes a display field, preferably located on the vehicle windscreen that, from the viewpoint of the driver, is larger than a primary field of vision can be scanned without eye movement on the part of the vehicle driver. The driver assistance system also includes a control unit for displaying signs at different locations in the display field, and a hazard detection unit for detecting at least the direction in which a hazard or hazard outside the vehicle is located from the viewpoint of the driver. The control unit is configured, upon detection of a hazard or source of danger, first to display a preliminary signal in a preferred direction from the viewpoint of the driver, and then to display at least a first follow-up signal in an intermediate direction between the preferred direction and the direction in which the danger source is located. The angle of separation between the preferred direction and the direction of the first follow-up signal is smaller than the angular range of the primary field of vision, preferably less than half the angular range of the primary field of vision. The preferred direction should be a direction in which the driver is expected to look with a very high degree of probability. Therefore, according to one variant of the present disclosure the lengthwise direction of the vehicle is particularly frequently considered for purposes of the preferred direction.

According to an advanced variant, the control unit may be connected to a camera or other means for detecting the direction in which the driver is looking such that the viewing direction may be the direction detected by the sensor, or according to a variant thereof, it may differ from the viewing direction by as much as half of the primary field of vision in the direction of the hazard.

In all these variations, because it is positioned in the driver's primary field of vision, the preliminary signal attracts the driver's visual attention immediately. It is triggered and entirely reflexively, and the driver is not required to make a conscious decision to do this. Such a reflexive attraction of the driver's viewing direction only takes a short time, not more than a few milliseconds, and is largely unaffected by the driver's level of concentration. When the driver looks at the preliminary signal, the follow-up signal is seen immediately since the follow-up signal is positioned in the driver's field of vision. The follow-up signal can in turn attract the driver's view very quickly.

If the angular separation between the first follow-up signal and the hazard is greater than half of the primary field of vision, so that the hazard itself does not lie within the primary field of vision when the driver's view is directed at the first follow-up signal, the control unit may be configured to generate at least one further follow-up signal, the direction of which between that of the first follow-up signal and the direction of the hazard. Particularly, if each follow-up signal is generated at with an angular separation not greater than half of the primary field of vision, the driver's vision may be attracted extremely quickly in such manner that the hazard is shifted into his primary field of vision. In this way, early awareness of the hazard on the part of the driver is enhanced, and the time needs in order to respond to a hazard originating therefrom is prolonged.

The primary field of vision that a human is capable of perceiving without moving his eyes typically extends azimuthally through 40°. Accordingly, the primary field of vision of the driver assistance system according to the present disclosure should extend over not more than 40° in the azimuthal direction.

A delay between the preliminary signal and the first follow-up signal, and optionally between subsequent follow-up signals should be at least 50 milliseconds (ms) long, so that the human eye can detect the sequence of signals and follow the direction of the signals with its natural saccade movements. On the other hand, the time delay between the preliminary signal and the first follow-up signal should not be longer than 100 ms, so that the driver's view is directed to the hazard as quickly as possible.

In order to create a movement that is easy to follow and apparently continuous, at least one intermediate signal may be generated in a direction between the directions of the preliminary signal and the first follow-up at a time between the times of the preliminary signal and the first follow-up signal.

As noted above, the display field may be located on the motor vehicle windscreen. Additionally, it may extend as far as at least one side window of the motor vehicle. The display field preferably extends along the bottom edge of the motor vehicle windscreen.

A further object of the present disclosure is a computer software product containing work instructions which, when executed on a computer, enable it so function as the control unit in a driver assistance system such as described above, and a machine-readable data carrier on which software instructions are recorded that enable a computer to function in this manner.

BRIEF DESCRIPTION OF THE DRAWINGS

The present disclosure will hereinafter be described in conjunction with the following drawing figures, wherein like numerals denote like elements.

FIG. 4 shows the windscreen with a second follow-up signal displayed;

FIG. 5 shows the windscreen with a third follow-up signal displayed; and

FIG. 6 shows a view of a second variant of the present disclosure similar to that of FIG. 1.

DETAILED DESCRIPTION

The detailed description is merely exemplary in nature and is not intended to limit the invention or the application and uses of the invention. Furthermore, there is no intention to be bound by any theory presented in the preceding background of the invention or the following detailed description.

Figure 1:
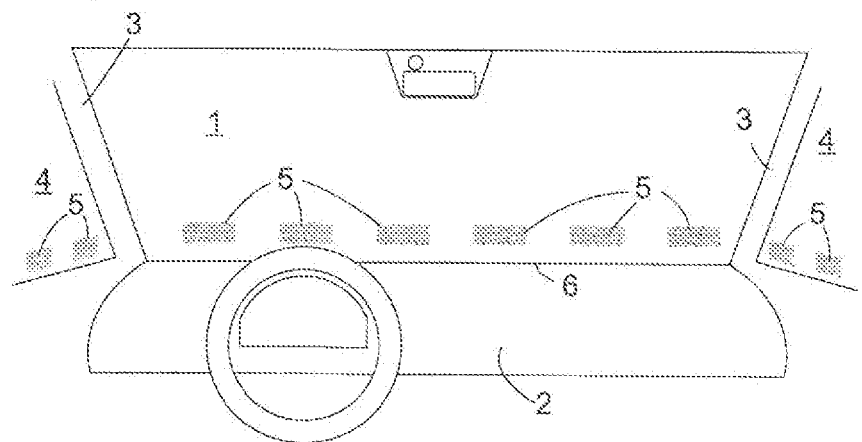
FIG. 1 is a schematic view of a windscreen and dashboard of a motor vehicle equipped with a driver assistance system according to the present disclosure.

FIG. 1 shows a schematic view of the motor vehicle windscreen 1 from the perspective of a driver, a dashboard 2 extending below windscreen 1, of A-pillars 3 that laterally enclose windscreen 1 and of side windows 4 adjacent to the A-pillars 3. The hatched positions 5 that are distributed on windscreen 1 and possibly also on side windows 4, each close to the bottom edge thereof, designate positions where an illuminated signal visible to the driver can be displayed. In order to display these illuminated signals, positions 5 may be designed so that they can be illuminated themselves, for example by embedding light emitting diodes between two layers of mineral glass of windscreen 1 or a pane of side window 4 or attached by adhesion to the inside thereof. Alternatively, positions 5 may divert extraneous light from external light sources to the eyes of the driver, for example by the action of diffusion centers incorporated at positions 5 in windscreen 1 or the side window, and which diffuse light that is coupled into the window via an edge thereof toward the eyes of the driver. It is also conceivable for each position 5 to reflect light from the emitting light sources embedded in dashboard 2 against windscreen 1 and to the eyes of the driver. According to yet another variant, in contrast to the illustration of FIG. 1 the positions may be formed by light sources that are directly visible in the driver, and which are distributed on the dashboard 2 along a bottom edge 6 of windscreen 1 or on a door panel below side window 4.

In the following, of these various variants the exemplary case will be considered in which positions 5 are self-illuminating. It should be understood that all teachings related for this case could also be transferred to the other variants of positions 5.

Besides these various illumination-capable positions 5, the driver assistance system also includes a hazard detection unit 13 of a type known per se, for example a radar system or a camera for detecting objects in the road in front of the vehicle or at the side of the road, and a control unit 12 that actuates the illumination-capable positions 5 on the basis of the information supplied by hazard detection unit 13, and which is typically realized in the form of a microcomputer.

Figure 2:
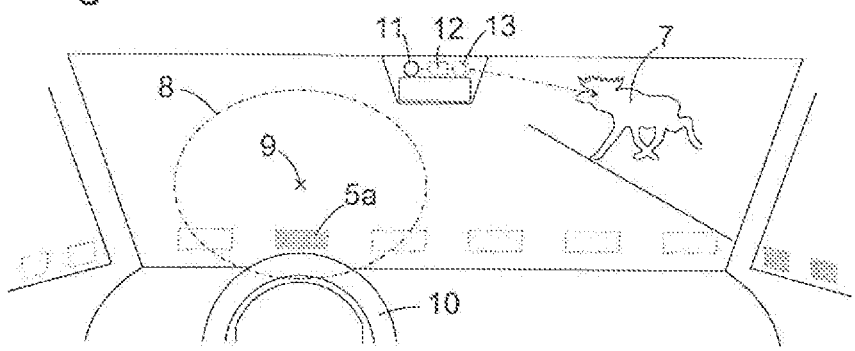
FIG. 2 shows the windscreen with a preliminary signal displayed after detection of a hazard or source of danger.

FIG. 2 shows the case in which a hazard or source of danger, here an animal 7 on the side of the road, has been detected by hazard detection unit 13. Control unit 12 responds by switching on one of the positions 5, designated here by 5a to generate a preliminary signal. Position 5a intersects with a primary field of vision 8 of the driver, which is centered in a viewing direction 9. The mere awareness of the illuminated position 5a may already suffice to place an alert driver in a state of readiness to apply the brakes.

Viewing direction 9 may be a notional standard viewing direction, typically in the forward direction of travel of the vehicle. It is also conceivable to specify the viewing direction 9 such that is deviates from the direction of travel of the vehicle in proportion to an angle of deflection of a steering wheel 10, according to the adaptive directional control of the vehicle front headlights, which is known per se. As a further alternative, means for detecting the driver's viewing direction, in this case a camera 11 directed at the driver, may be arranged in the passenger cabin of the vehicle and connected to the control unit 12, in order to detect the actual viewing direction 9 of the driver and generate the preliminary signal with the position 5 that lies in the primary field of vision 8, or, if there is more than one such position 5, to select the position 5 from these that is offset in the direction of the hazard 7 with respect to viewing direction 9.

Figure 3:
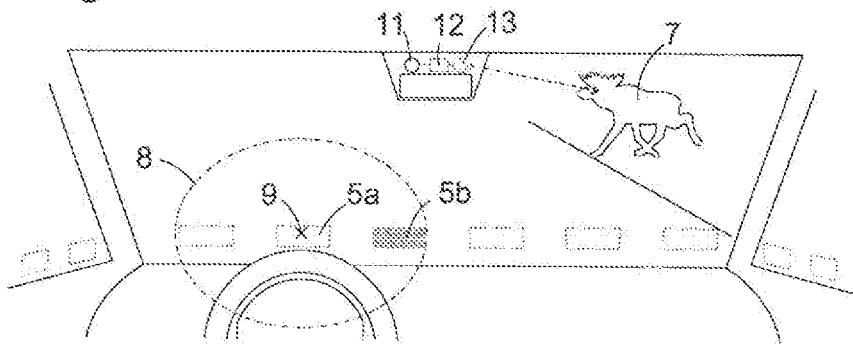
FIG. 3 shows the windscreen with a first follow-up signal displayed.

When position 5a is switched on, the driver reacts reflexively by shifting his viewing direction 9 to position 5a, as shown in FIG. 3. With a time delay of a little more than 50 milliseconds (ms) after the preliminary signal is generated by position 5a, control unit 12 generates a first follow-up signal at position 5b, which is located next to position 5a and closer to the hazard 7. Since the driver has directed his view toward position 5a within this time period, the first follow-up signal from position 5b is now also located in the primary field of vision 8 and by its appearance it attracts the driver's visual attention. In this way, the driver's viewing direction 9 shifts to position 5b within a further 50 ms, and a second follow-up signal is generated at position 5c.

This procedure is repeated again, as shown in FIG. 4, until a third follow-up signal, generated at position 5d as illustrated by arrows in FIG. 5, has diverted the driver's viewing direction 9 to such an extent that the primary field of vision 8 at least overlaps the hazard 7, and the driver is thus in a position to become consciously award of the hazard 7 and adjust his driving behavior accordingly.

The initial and follow-up signals go out again after a short time, so that particularly the light of the most recent follow-up signal does not prevent the driver from becoming aware of the hazard 7. The time for which the signals remain active may be chosen to be equal to the time offset between consecutive signals, or slightly shorter, so that only one of the positions 5 is illuminated at any given time, and may thus attract the driver's view to itself exclusively.

Positions 5 are each arranged along the bottom edge of windscreen 1, seen from the viewpoint of the driver, with an angular separation of about 20°, corresponding to half of the primary field of vision in the azimuthal direction, in such manner that the driver's vision is diverted by a further 20° approximately every 50 ms. Of course, positions 5 may also be arranged with a smaller angular separation between them, as shown in FIG. 6, although this should not result in the shift of the viewing direction being slowed down. The time delay with which each of the positions 5*a*, 5*b*, 5*c* are switched on, corresponding to an angular separation of half the primary field of vision, for generating initial and follow-up signals, is therefore also 50 ms in this case too. If, as shown here, three intermediate positions 5*a*1, 5*a*2, 5*a*3 or 5*b*1, 5*b*2, 5*b*3 are interposed between positions 5*a*, 5*b* or 5*b*, 5*c*, they may be periodically switched on over the time delay (e.g. 50/4 ms or every 12.5 ms), thereby creating the impression of a light signal that continuously moves from the original viewing direction of the driver toward the hazard. In order to guarantee adequate visibility despite the small dimension of positions 5 in this case, a plurality of adjacent positions, for example 5*b*2, 5*b*3, 5*c*, may also be switched on simultaneously here.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A driver assistance system for a motor vehicle comprising:
    a display field that is configured to be located on at least one window associated with the motor vehicle that from a viewpoint of a vehicle driver is larger than a primary field of vision of the vehicle driver that is viewable without eye movement on the part of the vehicle driver;
    a hazard detection unit for detecting at least a direction in which a hazard outside the motor vehicle is located from the viewpoint of the vehicle driver; and
    a control unit in communication with the hazard detection unit and configured to display signs at different positions in the display field upon detection of a hazard, wherein the control unit displays a preliminary signal in the display field in a preferred direction from the viewpoint of the vehicle driver, corresponding to a first position, and then displays a follow-up signal in a second position corresponding to an intermediate direction between the preferred direction and the direction in which the hazard is located, wherein an angle of separation between the preferred direction and the direction of the follow-up signal is smaller than an angular range of the primary field of vision.

2. The driver assistance system according to claim 1, wherein the preferred direction is a direction of forward travel of the motor vehicle.

3. The driver assistance system according to claim 1, further comprising a camera configured to detect the viewing direction of the vehicle driver and connected to the control unit, wherein the preferred direction corresponds to the viewing direction and the preferred direction deviates from the viewing direction by up to one-half of the primary field of vision in the direction of the hazard.

4. The driver assistance system according to claim 1, wherein the follow-up signal comprises a first follow-up signal and a second follow-up signal in the second position and at least one second follow-up signal, the direction of which is located between that of the first follow-up signal and the direction of the hazard when the angular separation between the position of the first follow-up signal and the hazard is greater than one-half of the primary field of vision.

5. The driver assistance system according to claim 4, wherein an angle between the positions of consecutive second follow-up signals is not greater than half of the primary field of vision.

6. The driver assistance system according to claim 1, wherein the primary field of vision measures a maximum of 40° in azimuthal direction.

7. The driver assistance system according to claim 1, wherein the control unit is configured to delay between the preliminary signal and the follow-up signal for a time delay which is not less than 50 milliseconds.

8. The driver assistance system according to claim 1, wherein the control unit is configured to delay between the preliminary signal and the follow-up signal for a time delay which is not more than 100 milliseconds.

9. The driver assistance system according to claim 1, wherein at least one intermediate signal is generated in a direction between the preliminary signal and the follow-up signal at a point in time between the preliminary signal and the follow-up signal.

10. The driver assistance system according to claim 1, wherein the at least one window is a windscreen of the motor vehicle and the display field is configured to be located on the windscreen of the motor vehicle.

11. The driver assistance system according to claim 10, wherein the at least one window is at least one side window of the motor vehicle and the display field is configured to extend to the at least one side window of the motor vehicle.

12. The driver assistance system according to claim 10, wherein the at least one window is a vehicle windscreen, and the display field is configured to extend along a bottom edge of the vehicle windscreen.

13. A non-transitory machine-readable medium comprising software instructions recorded on the medium which are configured to be executed on a computer to operate as the control unit in a driver assistance system according to claim 1.

14. A computer software product comprising a microprocessor and memory storing program instructions which, when executed on the microprocessor operates the control unit in a driver assistance system for a motor vehicle, the driver assistance system including:
    a display field that is configured to be located on the windscreen of the motor vehicle, the display field larger than a primary field of vision of the vehicle driver that is viewable without eye movement on the part of the vehicle driver;
    a hazard detection unit for detecting at least a direction in which a hazard outside the motor vehicle is located from a viewpoint of the vehicle driver; and
    a control unit in communication with the hazard detection unit and configured to display signs at different positions in the display field upon detection of a hazard, wherein the control unit displays a preliminary signal in the display field in a preferred direction from the viewpoint of the vehicle driver, corresponding to a first position, and then displays a follow-up signal in a second position corresponding to an intermediate direction between the preferred direction and the direction in which the hazard is located, wherein an angle of separation between the preferred direction and the direction of the follow-up signal is smaller than an angular range of the primary field of vision.

\* \* \* \* \*